United States Patent [19]

Naoi et al.

[11] Patent Number: 4,814,911
[45] Date of Patent: Mar. 21, 1989

[54] VIDEO CASSETTE FRONT LOADING SYSTEM FOR VIDEO TAPE RECORDER

[75] Inventors: Akira Naoi, Yaita; Yuichi Yamamoto, Utsunomiya, both of Japan

[73] Assignee: Sharp Kabushiki Kaisha, Osaka, Japan

[21] Appl. No.: 71,592

[22] Filed: Jul. 7, 1987

Related U.S. Application Data

[63] Continuation of Ser. No. 694,142, Jan. 23, 1985, abandoned.

[30] Foreign Application Priority Data

Jan. 23, 1984 [JP] Japan ............... 59-7834[U]
Jan. 23, 1984 [JP] Japan ............... 59-7835[U]
Jan. 23, 1984 [JP] Japan ............... 59-7837[U]
Jan. 23, 1984 [JP] Japan ............... 59-7838[U]
Jan. 24, 1984 [JP] Japan ............... 59-8671[U]
Feb. 1, 1984 [JP] Japan ............... 59-17843
Feb. 7, 1984 [JP] Japan ............... 59-21423
Apr. 16, 1984 [JP] Japan ............... 59-56094[U]
Jun. 15, 1984 [JP] Japan ............... 59-89841[U]
Jun. 15, 1984 [JP] Japan ............... 59-89845[U]

[51] Int. Cl.$^4$ ............... G11B 5/027; G11B 15/675
[52] U.S. Cl. ............... 360/85; 360/96.5
[58] Field of Search ............... 360/96.5, 96.6, 85, 360/93, 95; 242/197-200

[56] References Cited

U.S. PATENT DOCUMENTS 3,900,171 8/1975 Serizawa ............... 360/132 X
4,308,562 12/1981 Negishi ............... 360/96.5 X
4,319,292 3/1982 Katoh ............... 360/96.5
4,379,313 4/1983 Tsuchiya ............... 360/96.5
4,539,610 9/1985 Takai ............... 360/93

Primary Examiner—A. J. Heinz
Attorney, Agent, or Firm—Birch, Stewart, Kolasch & Birch

[57] ABSTRACT

A cassette loading system for a cassette tape recorder comprises a holder storing a tape cassette, a first transport device for horizontally transporting the cassette holder, and a second transport device for vertically transporting the cassette holder. The holder is provided with a holder arm rotatable around an axis perpendicular to the direction of inserting the cassette. A guide is provided responsive to the rotation of the holder arm for guiding the cassette holder upward and downward as the narrowest width of the cassette is horizontal. A detection device may be provided for detecting the completion of horizontally transporting the cassette. A preventing device may further be provided for preventing the cassette holder from being switched from a first pathway for the first transport device to a second pathway for the second transport device.

18 Claims, 21 Drawing Sheets

VIDEO CASSETTE FRONT LOADING SYSTEM FOR VIDEO TAPE RECORDER

This application is a continuation of application Ser. No. 694,142, filed on Jan. 23, 1985, now abandoned.

BACKGROUND OF THE INVENTION

The present invention relates to a video tape recorder and, more particularly, to a video cassette front loading system for a video tape recorder.

Conventionally, a video cassette loading system for a video tape recorder is inserted into the recorder along the elongated side of the video tape cassette. For such a lateral insertion system of the cassette that the wide width side is faced to the recorder surface, the front side of the video tape recorder is provided with a wide cassette-insertion inlet so that the number of key switches to be provided in the front side of the recorder must be limited and their size must be miniaturized. Further, in such a recorder, a cassette holder elevator for elevating a cassette holder containing the cassette must be provided at both sides of the cassette holder, so that the cassette storing system is large.

Therefore, it is desired to provide an improved cassette insertion device for receiving the cassette at its small cassette inlet as mush as possible, such that the narrow side of the cassette when the narrowest width of the cassette is horizontal is faced against the front side of the recorder.

SUMMARY OF THE INVENTION

Accordingly, it is an object of the present invention to provide an improved cassette loading system for a video cassette recorder characterized in that the narrow side of a tape cassette is placed against the front surface of the recorder. In such an arrangement, the tape cassette store in the cassette holder is first moved horizontally forward and second, in response to the detection of the horizontal forward ending signal, the cassette holder is vertically loaded to the video cassette recorder.

It is another object of the present invention to provide an improved cassette loading system for a video cassette recorder for releasing the locking of a front cover while the narrow side of the cassette is faced to the insertion surface of the recorder and is inserted into the recorder.

It is a further object of the present invention to provide an improved cassette loading system for a video cassette recorder comprising a cassette elevating mechanism for elevating and lowering a cassette holder.

It is still a further object of the present invention to provide an improved cassette loading system for a video cassette recorder for reducing any loading of a cassette feeding roller, so that the switching from the cassette horizontal movement to the cassette vertical movement is smooth.

It is yet a further object of the present invention to provide an improved cassette front loading system for a cassette recorder such that the single cassette recorder is provided with two sets of cassette loading assemblies positioned substantially in parallel within the side of the recorder in which the width of the cassette recorder is substantially identical to that of a type of cassette recorder with only one set of cassette loading assembly.

Briefly described, in accordance with a first preferred embodiment of the present invention, a cassette loading system for a video cassette recorder is characterized by comprising holder means for storing a cassette, holder arm means coupled with the cassette holder means, the holder arm means being rotatable around an axis perpendicular to the direction of inserting the cassette, and guide means responsive to the rotation of the holder arm means for guiding the cassette holder means upward and downward as the narrowest width of the cassette is horizontal.

In accordance with a second preferred embodiment of the present invention, the cassette loading system comprises first transport means for horizontally transporting the cassette, detection means for detecting the completion of horizontal transportation of the cassette, the detection means being provided on the cassette holder means, second transport means for vertically transporting the cassette, and preventing means for preventing the cassette holder means from being changed from a first pathway for the first transport means to a second pathway for the second transport means, so that when the detection means detects the completion of the horizontal transport of the cassette, the preventing means is made inoperative.

In accordance with a third preferred embodiment of the present invention, the cassette loading system further comprises release means for releasing the preventing operation of the preventing means and said preventing means is driven with a clutch mechanism, and lock means for locking the release means not to release the preventing operation of the preventing means before the first transport means has completed the first transport operation of the cassette, so that the clutch mechanism and the preventing means are integrally combined.

In accordance with a fourth preferred embodiment of the present invention, the cassette loading system still further comprises the second transport means comprising spiral cam means and bar means with engagement means engaged with the spiral cam means, and second preventing means for preventing the release means from releasing the preventing operation of the first preventing means while the spiral cam means is rotated at a predetermined phase.

In accordance with a fifth preferred embodiment of the present invention, the cassette loading system yet further comprises means for lowering the cassette holder means, stop means for stopping the lowering operation of the means for lowering, release means for releasing the stop operation of the stop means in response to the loading operation of the cassette, coupling means interposed between the stop means and the release means for transporting an instruction of releasing the stop means, so that the power from driving means is forwarded into the release means, the preventing operation of the stop means being effected according to the power of the means for lowering.

In accordance with a sixth preferred embodiment of the present invention, the cassette loading system additionally comprises the coupling means interposed between the stop means and the release means for coupling the power from the driving means to the stop means in response to the release operation of the release means, so that the release operation of the stop means is effected by the power of the lowering means.

In accordance with a seventh preferred embodiment of the present invention, the cassette loading system further additionally comprises limit means, in the first transport means horizontally transporting the cassette, for limiting the upper limit of a transport force of horizontally transporting the cassette holder means.

In accordance with an eighth preferred embodiment of the present invention, the cassette loading system still further additionally comprises the cassette holder means being such that the distance between the cassette and a cassette base surface in the cassette holder means is a little smaller than the thickness of the cassette, roller means for forcibly transporting the cassette, the roller means being stressed toward the cassette holder means so that the cassette is supported elastically between the roller means and the cassette base surface, bearing collar means of rotative axis means supported for moving in a direction of rotating the roller means in frame means, the rotative axis means having the roller means, a first and second operating members projected from the bearing collar means as being opposed to each other so that the first operating member is engaged with the frame means, and sensor means for detecting in terms of the deviation of the second operating member whether the bearing collar means is deviated owing to the condition that in response to the loading of the cassette, the roller means is separated from the cassette base surface against the stress of the roller means, the roller means being rotated in response to the detection of the sensor means. Further scope of applicability of the present invention will become apparent from the detailed description given hereinafter. However, it should be understood that the detailed descriptin and specific examples, while indicating preferred embodiments of the inventin, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

An attention is now directed to a preferred embodiment of the present invention in which the narrow side of a horizontal cassette is faced against the front surface of a tape recorder. When loading the cassette into the inner side of the recorder, the cassette is first moved horizontally forward and then is moved vertically downward.

Figure 1:
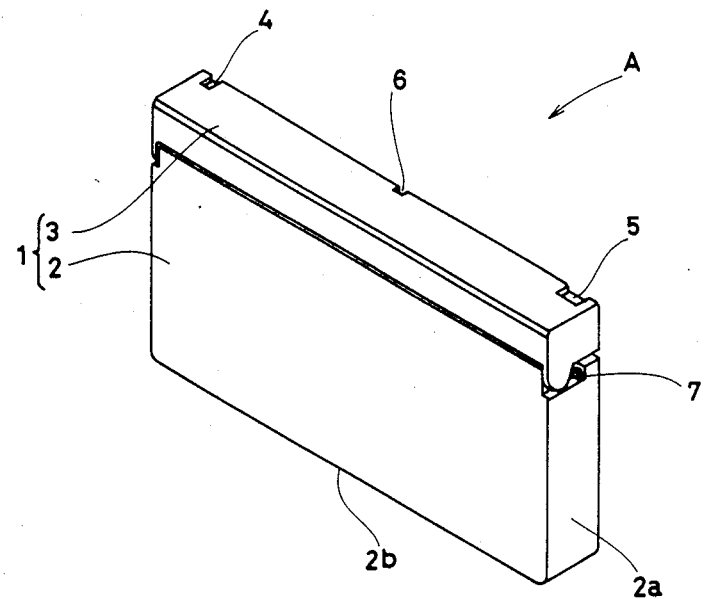
FIG. 1 is a perspective view of a cassette used for a first preferred embodiment of the present invention.
Figure 2:
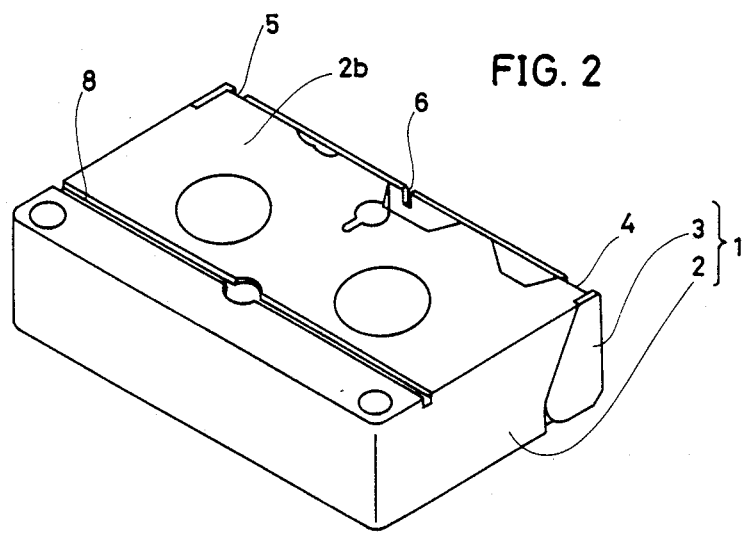
FIG. 2 is a bottom view of the cassette viewed from side A of FIG. 1.

FIG. 1 is a perspective view of video cassette for a cassette loading system of the present invention. FIG. 2 is a bottom view of the cassette viewed from the arrow side A of FIG. 1.

The cassette 1 comprises a body 2 and a cover 3 pivotally movable in the upper portion of the body 2. In both ends of the cover 3, erase preventing claws 4 and 5 are provided. At the center of the cover 3, an error-insertion preventing groove 6 is provided for preventing the cassette from erroneously being inserted into the cassette recorder in such a manner that the wider side of the cassette is faced with the inlet face of the recorder. In a side 2a of the body 2, a release projection 7 is provided for releasing the lock of the cover 3. By pressing the release projection 7, the cover 3 can be pivotally moved. In a bottom side 2b of the body 2, a groove 8 is provided for preventing the cassette from being erroneously inserted when it is forwarded in such a manner that the narrower side of the cassette when the narrowest width of the cassette is horizontal. The groove 8 is elongated along the longitudinal side of the cassette body 2.

Figure 3:
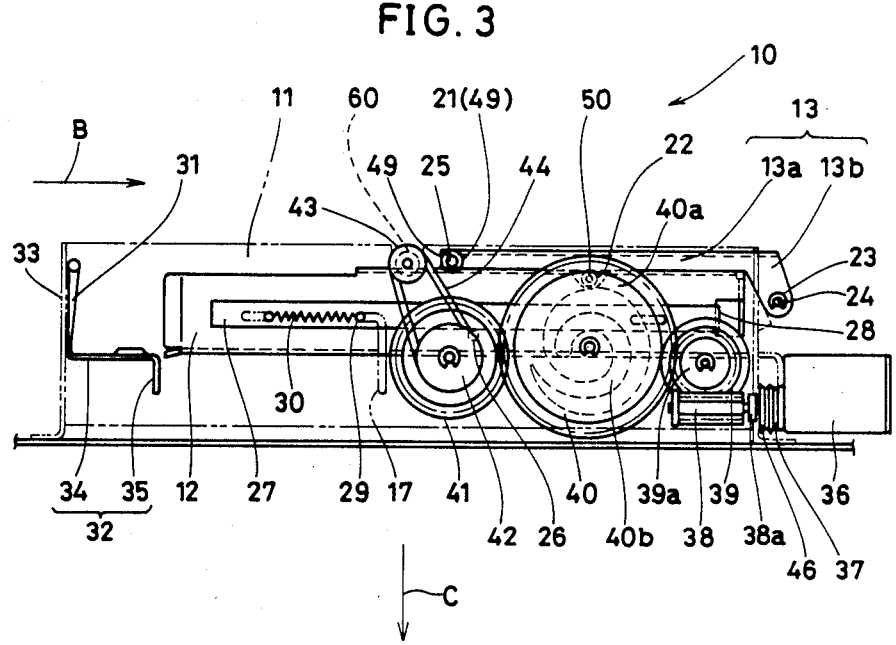
FIG. 3 is a side view of a cassette loading system according to a first preferred embodiment of the present invention.
Figure 4:
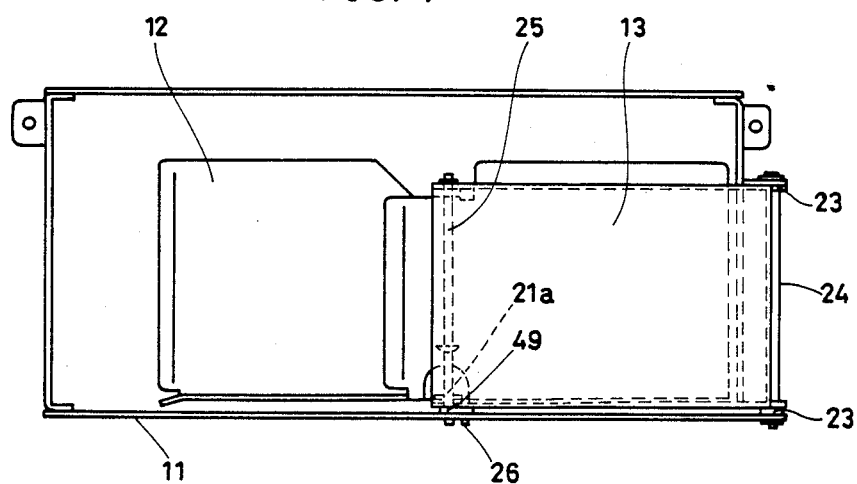
FIG. 4 is a plan view of FIG. 3.

FIG. 3 is a side view of a cassette loading system 10 according to the first preferred embodiment of the present invention. FIG. 4 is a plan view of the system 10.

Figure 5:
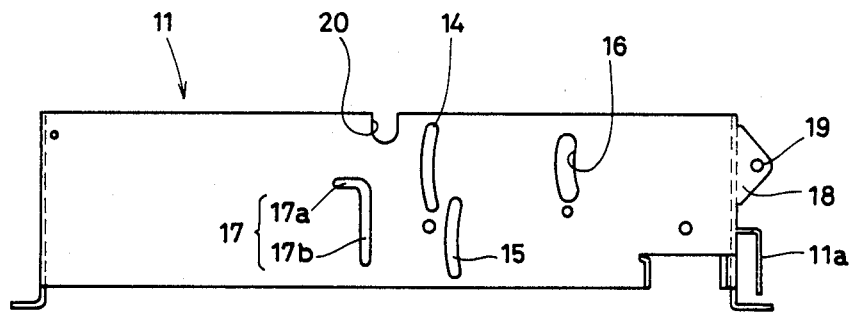
FIG. 5 is a side view of a frame in the cassette loading system for the first preferred embodiment of the present invention.

The cassette 10 comprises a frame 11 shown by a chain line, a cassette holder 12 stored inside the frame 11, a holder arm 13 positioned at the upper side of the cassette holder 12. The frame 11 is provided with elongated apertures 14, 15, and 16, and an L-shaped guide 17 as viewed in FIG. 5. The elongated apertures 14 and 16 are elongated along the width of the frame 11, so that their radiuses of curveture are identical. The elongated aperture 15 is elongated along the width of the frame 11 substantially in line. A projection 18 is positioned at the right side of the frame 11 and has an axis opening 19. A notch 20 opened upward is provided at the upper side of the frame 11.

The holder arm 13 contains a flat portion 13a and a curved portion 13b. An insertion aperture 21 is formed in the flat portion 13a. Another insertion aperture 23 is formed in the curved portion 13b. A pin 50 is provided with the holder arm 13 being inserted into the elongated aperture 16 of the frame 11.

The holder arm 13 is rotatable around the axis horizontal to the frame 11. A support axis 24 is inserted into the insertion aperture 23 of the holder arm 13 and the axis aperture 19 of the frame 11, so that the holder arm 13 is rotatable around the support axis 24 within the frame 11.

In the cassette holder 12, in contrast with the insertion aperture 21 of the holder arm 13, an insertion aperture 49 is provided. A support axis 25 is inserted through the insertion aperture 21 of the holder arm 13, the insertion aperture 49 of the cassette holder 12, and the elongated aperture 14 of the frame 11. A projection 26 is provided in the cassette holder 12 for being inserted through the elongated aperture 15 of the frame 11. Since the cassette holder 12 is fixed to the cassette holder 13 by the support axis 25, it can be lifted according to the rotation of the holder arm 13. The cassette holder 12 is fixed to the frame 11 by the support axis 25 and the projection 26 as being capable of being lifted. The cassette holder 12 can be lifted and lowered and is sufficiently supported horizontally. As apparant from FIG. 4, the holder arm 13 is maintained by the support axes 25 and 24, so that the horizontal condition of the cassette holder 12 can be ensured.

A cassette detection lever 27 is provided at the side of the cassette holder 12 in cassette insertion direction B. At the inner face of the cassette detection lever 27 and the tip portion (the rightmost portion of FIG. 3), an inwardly projecting cassette detection member 28 is provided. On the outer face of the cassette detection lever 27, a projection 29 is provided which is inserted through an L-shaped guide 17 of the frame 11. On the outer face of the cassette detection lever 27, a spring 30 is also provided. The end of the spring 30 is fixed to the side of the cassette holder 12 while the other end is fixed to the projection 29. Therefore, the cassette detection lever 27 is stressed in a direction opposite that of direction B by the force of the spring 30. A cassette inlet 33 in the left side of the frame 11 is provided with a lid 31 which is freely openable. Under the lide 31, an L-shaped cassette guide 32 is provided comprising a horizontal portion 34 and a vertical portion 35. As will be described below, the cassette 1 is inserted through the cassette inlet 33, so that it is guided by the horizontal portion 34 of the guide 32 to be positioned in the cassette holder 12. When the cassette 1 reaches to the horizontal-operation ending portion in the cassette holder 12, the cassette holder 12 is lowered in such a manner that its rear side (the leftmost portion of FIG. 3) is guided by the vertical portion of the guide 32.

A motor 36 is positioned at an attachment portion 11a of the frame 11. A belt 46 is winded over a rotation axis 37 of the motor 36 and a rotation axis 38a of the worm 38. The worm 38 can be engaged with a worm wheel 39. The worm wheel 39 is coaxially provided with a spur wheel 39a. The spur wheel 39a is engaged with a coaxial cam wheel 40 with a cam face. The cam wheel 40 is engaged with gear 41 with a pulley 42. A belt 44 is entrapped over the pulley 42 and a pulley 43 engaged with the notch 20 of the frame 11. The pulley 43 is provided coaxially with cassette forward rollers 60. The motor 36 is drived to rotate the pulley 43 through the pulley 42 and the belt 44, so that the rollers 60 are rotated to forward the cassette 1.

The cam wheel 40 contains a circular cam surface 40a and a spiral cam surface 40b both coupled. The pin 50 of the holder arm 13 is traveled as a follower along the cam surfaces 40a and 40b.

Figure 6:
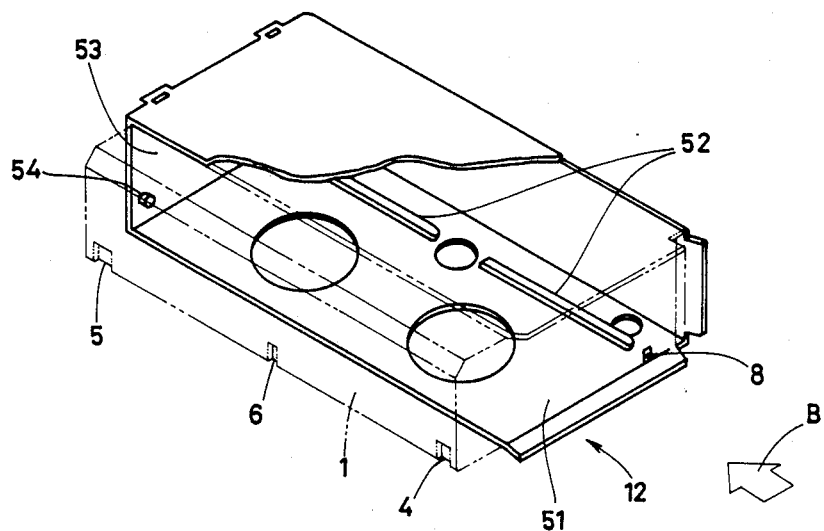
FIG. 6 is a perspective view of a cassette holder used for the first preferred embodiment of the present invention.

FIG. 6 is a perspective view, partially broken, of the cassette holder 12. In the bottom surface 51 of the cassette holder 12, a projection guide 52 is applicable to the preventing groove 8 formed in the cassette 1 to prevent the erroneous insertion. Since the projection guide 52 is elongated in the insertion direction B, it can be coupled with the prevention goove 8 over the long length. In addition to the horizontal condition of the cassette 1, when the front cover is downward, the cassette 1 can be sufficiently supported. A projection 54 is positioned at the rear surface 53 of the cassette holder 12. When the cassette 1 is inserted as shown in the chain line, the release portion 7 for releasing the locking of the cover 3 is push by the projection 54 to open the cover 3.

Figure 7:
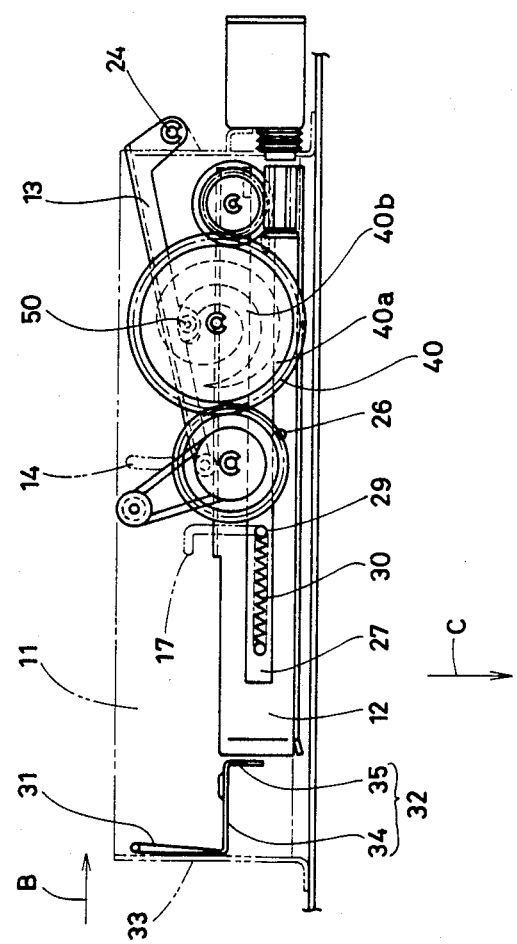
FIG. 7 is a side view of the combination of the cassette in the cassette loading system of the first preferred embodiment of the present invention.
Figure 8:
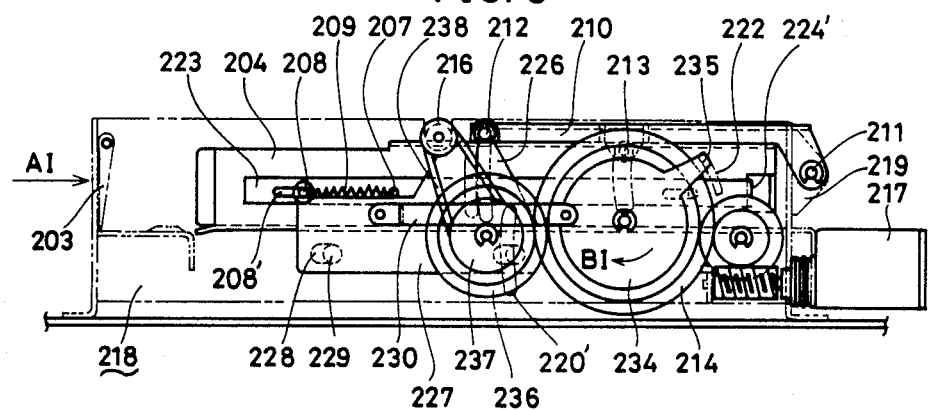
FIG. 8 is a side view of the cassette loading system to which no cassette is loaded according to a second preferred embodiment of the present invention.

FIG. 7 is a side view of the cassette loading system 10 storing the cassette. When the cassette 1 is not inserted as shown in FIG. 3, the insertion of the cassette 1 into the cassette recorder enables a cassette detection switch (not shown) to rotate the motor 36, so that the rotation force of the motor 36 can be forwarded to the pulley 43 via the belt 44 through the worm 38, the worm wheel 39, the wheel 40 and 41, and the pulley 42 to rotate the roller 60. By the rotation of the roller 60, the cassette 1 is forwarded in the arrow direction B. at the same time, the projection 29 of the cassette detection lever 27 is positioned at the horizontal portion 17a on the L-shaped guide 17, so that the cassette holder 12 is prevented from being lowered. Therefore, although the pin 50 of the holder arm 13 is positioned at the outermost portion of the spirl cam surface 40b in the wheel 40, namely, the circular cam surface 40a, it can be prevented from invading inside the inner portion of the spiral cam surface 40b. When the cassette 1 is forwarded within the cassette holder 12, the cassette detection member 28 of the cassette detection lever 27 is forced by the cassette 1, so that the cassette detection lever 27 is shifted in the arrow direction B against the force of the spring 30.

Thus, according to the first preferred embodiment of the present invention, in terms of the shift of the cassette detection lever 27, the projection 29 of the cassette detection lever 27 is reached from the horizontal portion 17a of the L-shaped groove 17 of the frame 11 to the end of the horizontal portion which leads to the vertical portion 17b, so that the cassette holder 12 can be moved downwardly. The pin 50 of the holder arm 13 can follow the inside of the spiral cam surface 40b. The spiral cam surface 40b continues to be rotated. When the pin 50 and the spiral cam 40b are engaged, the holder arm 13 becomes rotatable around the support axis 24, so that the cassette holder 12 moves downwardly into the direction of arrow C to reach the cassette storing completion position. The stored cassette can be taken out in the reverse manner as stated above.

A second preferred embodiment of the present invention is shown in FIGS. 8-20 wherein a supporting mechanism is improved to reduce the rotation load to a storing roller to be caused when the cassette is stored within the cassette holder.

The cassette loading system comprises a cassette elevator for vertically moving the cassette, a stop mechanism for stopping the down operation of the cassette elevator, a releasing mechanism for releasing the preventing operation by loading the cassette, and a correlation mechanism responsive to the power energy of a power source for correlating the release mechanism and the preventing mechanism.

With reference to FIGS. 8 through 16, in the cassette elevator, a frame 218 is provided with a cassette inlet 203 at an end and an attachment member 219 at the other side, in which an end of an arm 210 is pivotally coupled to the attachment member 219. Along a circular hole 221 in front of a frame 218 around the pivotal axis 211, a roller 213 is positioned which is pivotally coupled to the middle of the arm 210. At the tip of the arm 210, the upper center of the cassette holder 204 is pivotally supported by a pivotal axis 212. The outer side of the pivotal axis 212 and a pin 225 positioned downward the holder 204 are inserted through two circular apertures 220 formed in front of the frame 218 having a seesaw center of the arm 210. The cassette holder 204 is maintained horizontal with respect to the frame 218 while it can be raised and lowered according to the seesaw operation of the arm 210.

In front of the frame 218, a preventing plate 227 as the cassette raising and lowering prevention mechanism. Plate 227 slidable right and left by a pair of guide pins 229 projected on the frame 218 and elongated apertures 228 on the preventing plate 227. At the right upper side of the preventing plate 227, a preventing projection member 226 and a release cut-away groove 226' are formed. The preventing projection member 226' is attached to the outer side of the pivotal axis 212 for preventing its lowering operation. When the preventing plate 227 is moved in the cassette insertion direction, the pivotal axis 212 is released from the lowering preventing condition.

As the release mechanism, in front of the cassette holder 204, a slidable bar 223 is provided with both a bending member 224' positioned within the holder 204 through an opening 204' at the right side and a stopping member 224 bent at the right end upward and outward. The guide bar 223 becomes slidable due to guide bar elements 208 projected from the front surface of the holder 204 right and left, and elongated holes 208' provided on the slidable guide bar 223. A spring 209 is provided between a projected pin 207 at the left side of the guide bar 223 and the guide bar 208, so that the slidable guide bar 223 is urged toward the cassette unloading direction.

Between the release mechanism and the preventing mechanism, a correlation mechanism is provided which is responsive to the power application from a power source for correlating both mechanisms. As the correlation mechanism, a cam disk 214 is provided for rotating in response to a motor 217 positioned at the right end via an appropriate transmission means. A cylinder 233 is provided for pivotally supporting the cam disk 214 and a frinction transmission disk 234 in front of the frame 208. On the frinction transmission disk 234, a bending hook member 235 is projected facing the frame 218 through the circular hole 222 positioned at the right end of the frame 218 and resting on the top surface of the stop member 224 formed on the slidable guide bar 223. A bar 230 is extended between the transmission disk 234 and the stop disk 227. When the transmission disk 234 is rotated at the permissible length defined by the circular hole 222, the rotation movement is transmitted to the stop disk 227. On the cam disk 214 adjacent the transmission disk 234, a spiral groove 215 is coaxially formed on the surface facing with the frame 218 so that it is engaged with the roller 213 on the seesaw arm 210 projected outward through the circular hole 221 of the frame 218. Between the outer brim of the cylinder 239 and the cam disk 214, a spiral spring 231 is provided for affording a friction to the disks 214 and 234 through a friction member 234 provided between the cam disk 214 and the transmission disk 234. Through a transmission wheel 236' provided on the front surface of the frame 218 with a wheel 214' formed at the outer side of the cam disk 214, a cassette take-in roller 216 is correlated via the pulley 237, the belt 238. The roller 216 is pivotably provided on the top of the frame 218.

In operation, when the cassette is not loaded in the cassette holder 204, the slidable bar 223 is attracted toward the cassette intlet 203 by the spring 209. The stop member 235 of the transmission disk 234 rests against the top of the stop member 224 to stop the rotation of the transmission disk 234. The stop disk 227 is moved toward the cassette inlet 203. The outer end of the pivotal axis 212 of the seesaw arm 210 is attached to the top of the stop member 226 of the stop disk 227. When the cassette 1 is inserted in a depth through the inlet 203 of the frame 218 in direction AI, the power switch (not shown) of the motor 217 is set to drive it. Via the transmission mechanism comprising the belt, the speed-reduction means, the wheel member, the cam disk 214 is rotated in a constant speed in a predetermined direction (arrow BI direction). Its rotation enables the cassette take-in roller 216 on the top of the frame 218 to be rotated with the wheel 214' on the cam disk 214, the wheel 236, the pulley 237, and the belt 238.

Figure 9:
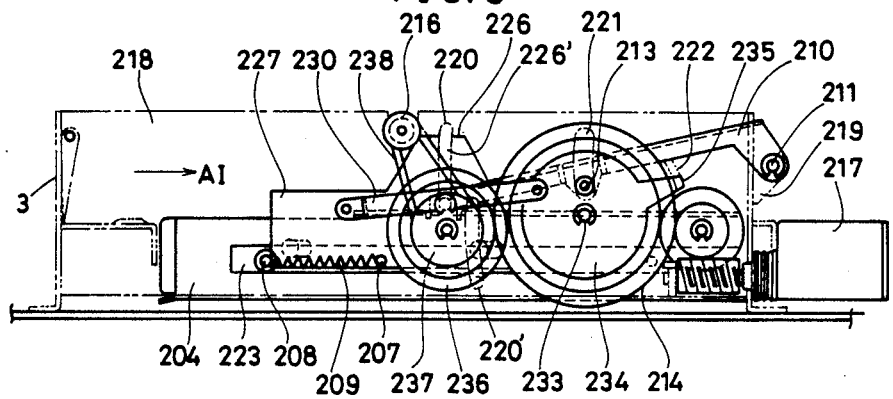
FIG. 9 is a side view of the cassette loading system to which a acssette is loaded according to the second preferred embodiment of the present invention.
Figure 10:
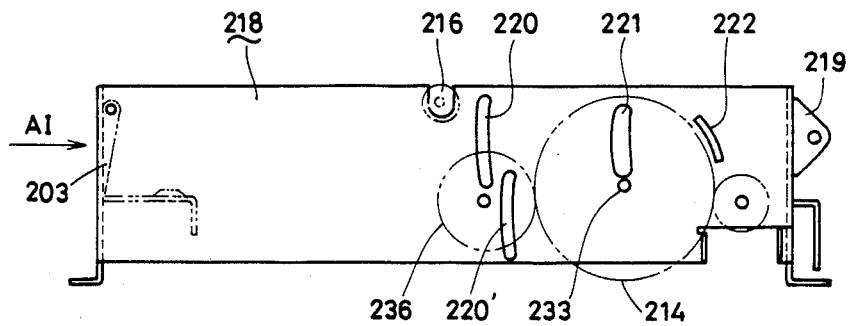
FIG. 10 is a side view of a frame used for the cassette loading system in the second preferred embodiment of the present invention.
Figure 11:
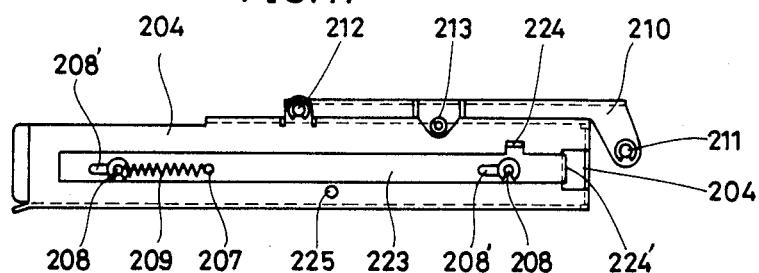
FIG. 11 is a side view of a a cassette holder used for the cassette loading system of the second preferred embodiment.
Figure 14:
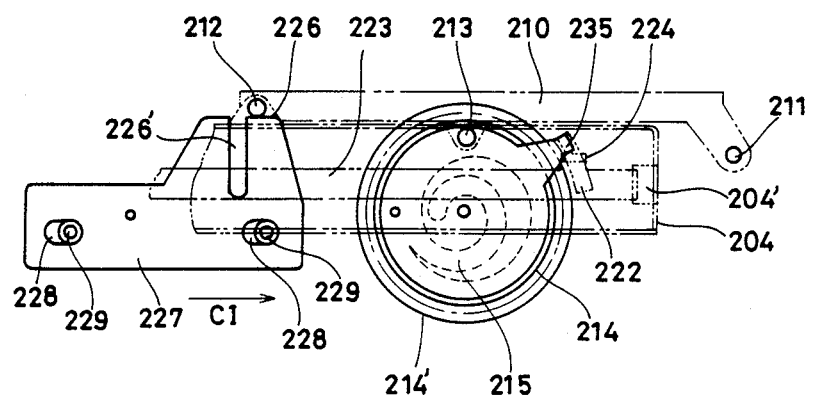
FIG. 14 is a side view of primary elements of the cassette loading system of the second preferred embodiment, showing the stop condition of a stop mechanism used for the cassette loading system.
Figure 15:
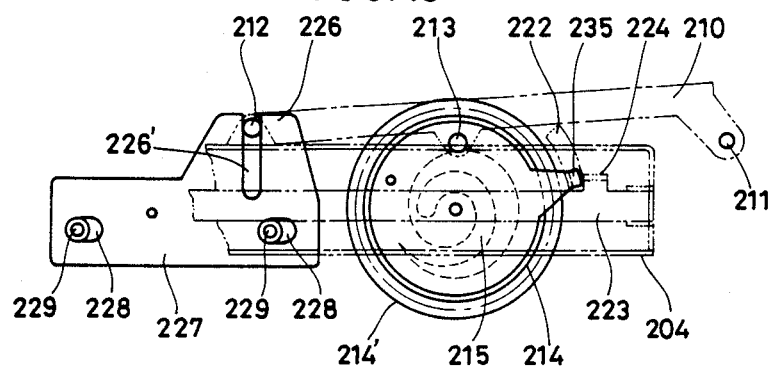
FIG. 15 is a side view of the primary elements of the cassette loading system of the second preferred embodiment, showing the condition of releasing the stop mechanism in the cassette loading system.
Figure 12:
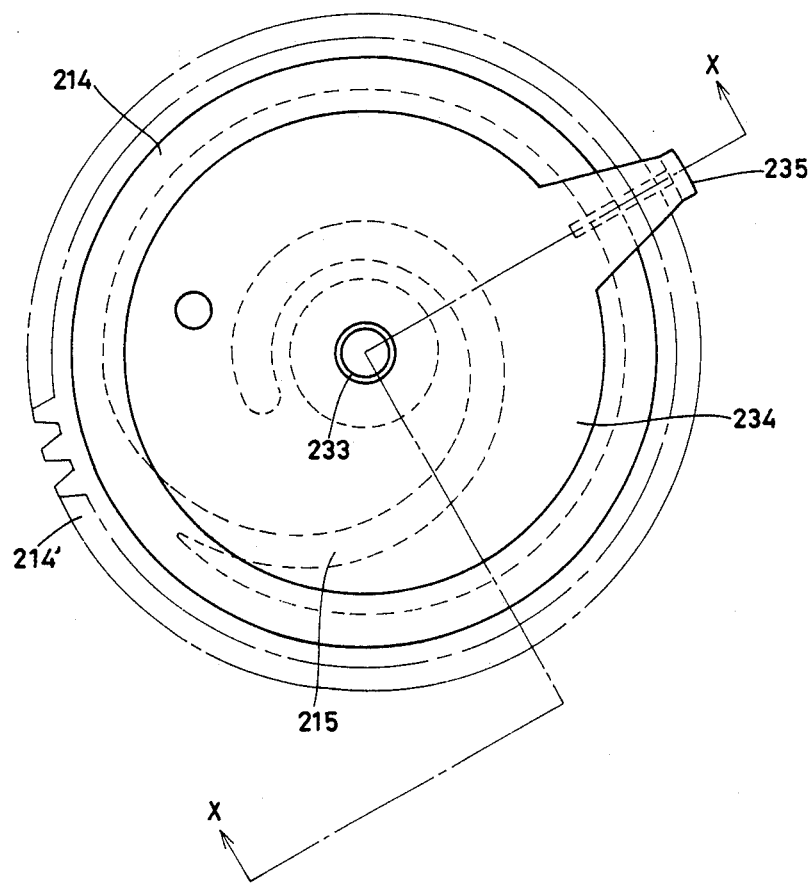
FIG. 12 is a front view of a cam plate and a connection plate used for the cassette loading system of the second preferred embodiment.
Figure 13:
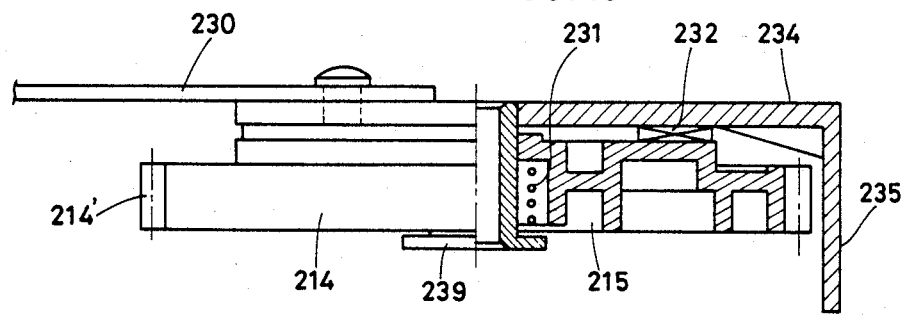
FIG. 13 is a sectional view of the cam plate and the connection plate as viewed from line X—X of FIG. 12.

The rotation of the roller 216 is defined as enabling the cassette to be taken in the holder 204. When the cassette is positioned in contact with the roller 216, the roller 216 subsequently forwards the cassette in the frame 218 with the roller in close contact to the top of the cassette. Eventually, the tip of the cassette contacts the acting member 224' of the slidable bar 223 inwardly projected from the side of the holder 204, so that against the force of the spring 209, it presses the slidable bar 223 in arrow direction AI. FIG. 9 shows this condition.

Therefore, the stop member 224 is moved. Till then, it stops the rotation of the stop member 235 of the transmission disk 234. To release the rotation stop of the stop member 235, the transmission disk 234 receives the rotation force of the cam disk 214 rotating in accordance with the power from the motor 217, so that it is rotated by the permissible distance defined by the circular hole 222. The stop disk 227 is moved through the bar 30 by the rotation length corresponding to rotation length of the cam disk 214 (arrow direction CI of FIG. 14). The contact between the pivotal axis 212 of the seesaw arm 210 and the projected stop member 226 is released.

Therefore, the pivotal axis 212 can be lowered toward the cut-away groove 226'. Initially, the projected stop member 226 supports the weight of the cassette, the holder, and the arm etc. According to the release operation, the seesaw arm 210 is lowered. When it is slightly lowered, the roller 213 positioned at the middle of the arm 210 is started to be engaged with the starting point of the spiral groove 215 of the rotating cam disk 214. The spiral groove 215 enables the roller 213 to be moved downwardly so that the cassette holder 204 is positioned at an appropriate position.

The cam disk 214 is continuously rotated by the motor 217. While the transmission disk 234 is stopped by the stop member 224 of the slidable bar 223, it is slipped by the friction member positioned between the cam disk 214 and the transmission disk 234, so that the continuous rotation of the cam disk 214 can be prevented.

As stated above, in terms of the second preferred embodiment of the present invention, according to the storing operation of the cassette into the cassette holder 204, the stop operation of the continuous mechanism can be released and further the power energy of the motor 217 can be transmitted to the stop disk 227 to release the lowering operation of the cassette holder 204, so that the lowering operation of the cassette holder 204 is accerelated.

Figure 17:
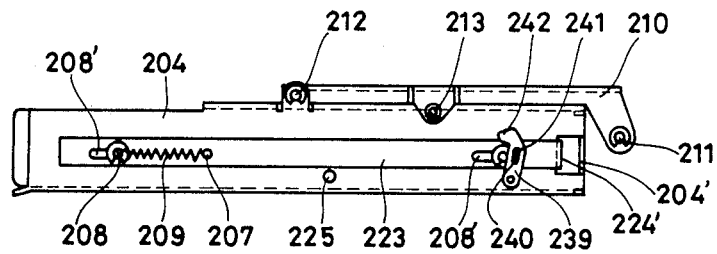
FIG. 17 is a side view of a cassette holder, showing a modification of a stop member 224 of a slidable bar 223 in the second preferred embodiment.
Figure 18:
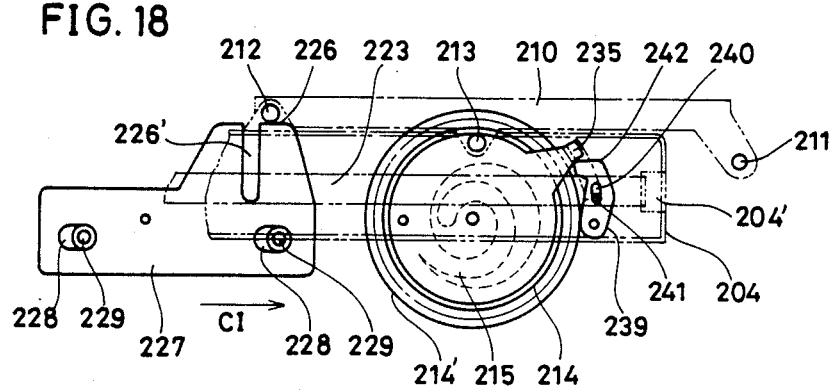
FIG. 18 is a side view showing the condition that a bending stop member 235 of a transmission plate 234 is locked by a lock lever 239.
Figure 19:
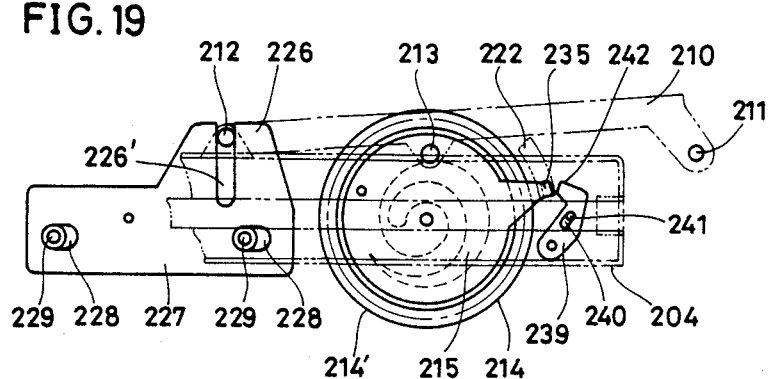
FIG. 19 is a side view, showing the condition that the lock of a bending member 235 of a transmission plate 234 is released with the rotation of a lock lever 239.
Figure 20:
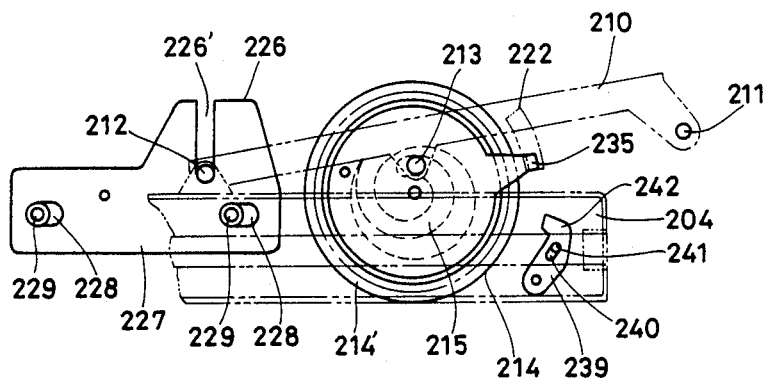
FIG. 20 is a side view, showing the condition after the lock of the bending member 235 of the transmission plate 234 by the lock lever 239 is released.
Figure 16:
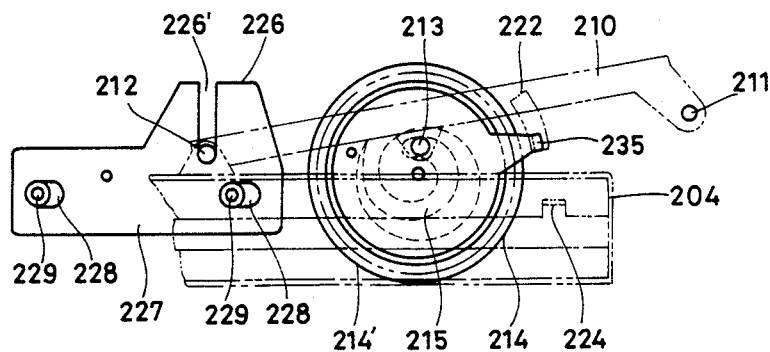
FIG. 16 is a side view of the primary elements of the cassette loading system of the second preferred embodiment, showing the final condition of releasing the stop mechanism in the cassette loading system.

It may be possible that the stop member 224 of the slidable bar 223 can be formed as shown in FIG. 17. FIGS. 18 through 20 show the operation.

The base of a lock lever 239 with a stop surface 242 on the top is pivotal and rotatable with the cassette holder 204. On the elongated hole 240 positioned at the center of the lock lever 239, a pin 241 fixed to the slidable bar 223 is inserted. While the cassette is not stored, the stop surface 242 of the lock lever 239 is in contact with the bending stop member 235 of the transmission disk 234 to stop the rotation of the transmission disk 234. When the cassette is stored, the movement of the slidable bar 223 enables the lock lever 239 to be rotated, so that the locking between the stop surface 242 and the bending stop member 235 is released. Thus, the release between the lock lever 239 and the stop member 235 of the transmission disk 234 becomes very smooth. Since the movement of the stop surface 242 is not equal to the movement of the slidable bar 223, the release accuracy can be improved. The operation of FIGS. 17-20 correspond the operation of FIG. 11, 14-16.

A third preferred embodiment of the present invention is shown in FIGS. 21-26 in which while a spiral cam disk is rotated at a predetermined distance, first stop means is provided for stopping the movement from the first traveling way of the cassette holder to the second traveling way of the cassette holder, and second stop means is provided for stopping the releasing operation of the release means releasing the stop operation of the first stop means in synchronization with the detection of the horizontal operation end.

Figure 21:
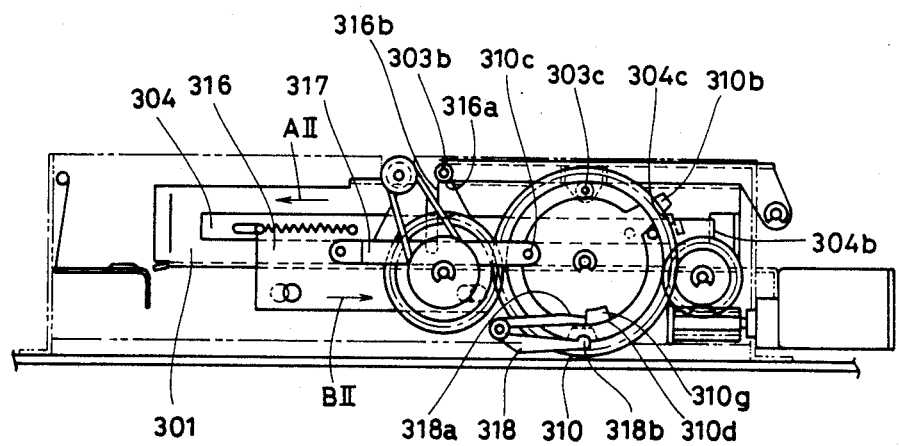
FIG. 21 is a side view of the cassette loading system of a third preferred embodiment of the present invention to which no cassette is loaded.
Figure 22:
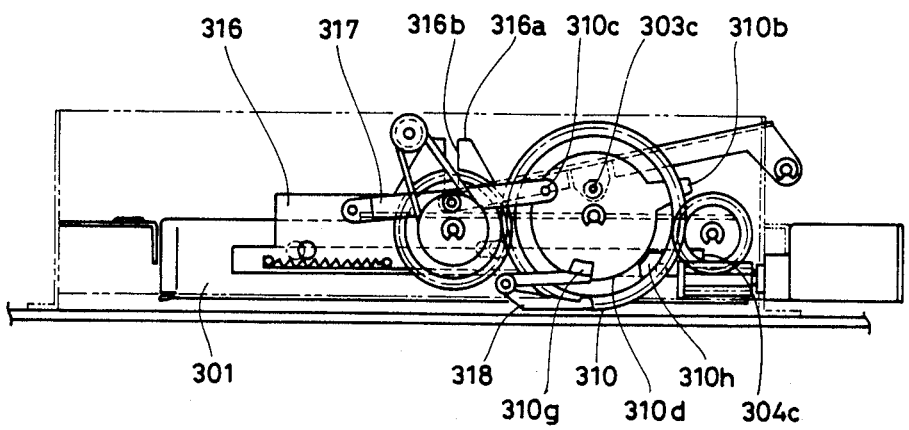
FIG. 22 is a side view, showing the condition that a cassette is loaded into the cassette loading system of FIG. 21.
Figure 23:
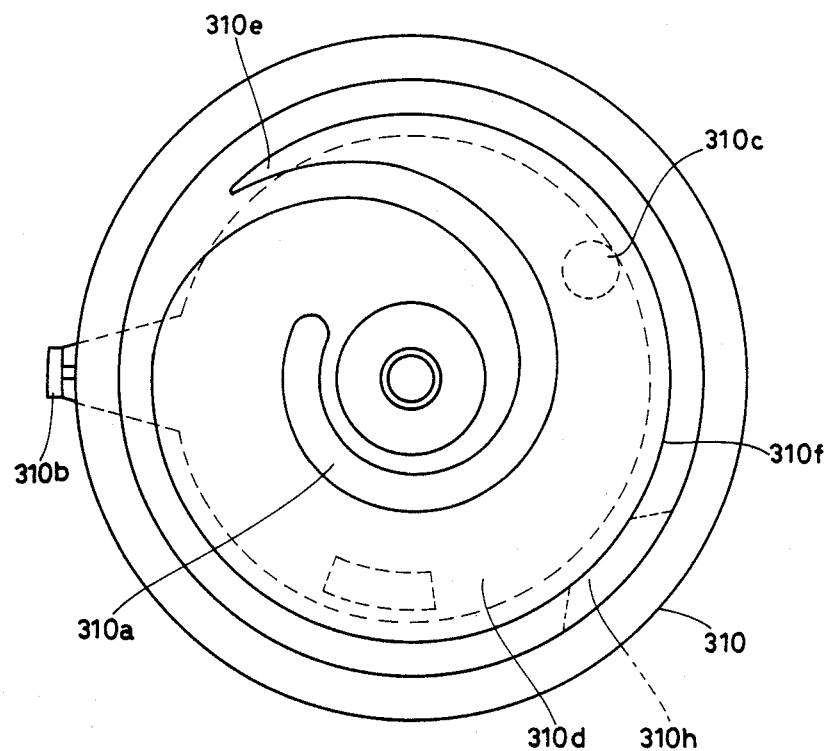
FIG. 23 is a rear view of a cam gear 310.
Figure 24:
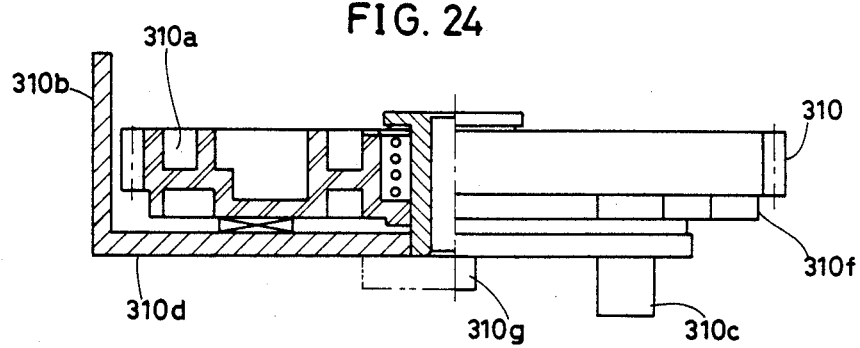
FIG. 24 is a partially broken view of FIG. 23.
Figure 25:
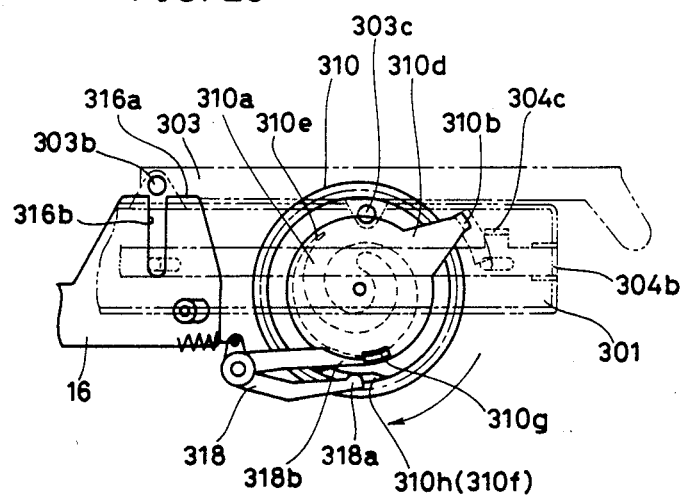
FIGS. 25 and 26 are drawings, showing the operation of the cassette loading system of the third preferred embodiment of the present invention.
Figure 26:
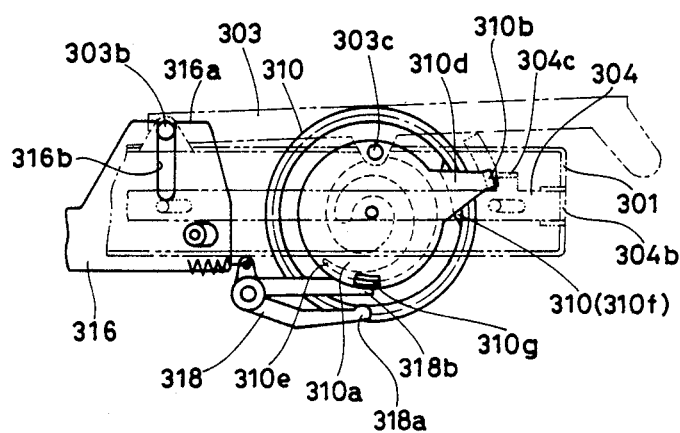

FIG. 21 shows a side view of the cassette loading system according to the third preferred embodiment of the present invention to which no cassette is loaded and stored. FIG. 22 shows a side view of the cassette loading system of FIG. 21 to which a cassette is stored. FIG. 23 shows a rear view of a cam gear 310. FIG. 24 shows its side view with partially broken.

The cam gear 310 is provided with a spiral cam groove in its circular side. A roller 303c of a holder arm 303 is faced with the cam groove. A stop disk 316 with a U-shaped groove 316b is provided for preventing the engagement between the roller 303c and the spiral cam groove. The cam gear 310 is provided with a clutch means so that the an engagement member 310b of the clutch means is engaged with a lock claw 304c of a cassette detection level 304.

When the cassette (not shown) is loaded in, the cassette detection lever 304 is horizontally moved in the reverse way of arrow direction AII. When the cassette detection lever 304 is positioned at the position as shown in FIG. 22, the cassette detection member 304b of the cassette detection lever 304 is pressed by the cassette, so that it is moved in the reverse direction to arrow direction AII. The lock claw 304c is released from the engagement member 310b of the clutch means. A clutch disk 310d of the clutch means is started to be rotated, so that the connectiom lever 317 attaracts the stop disk 316 in arrow direction BII. An axis 303b is released from the stop member 316b of the stop disk 316, so that it is inserted into the U-shaped groove 316. The roller 303c is inserted into the spiral cam 310a. The holder arm 303 is rotated in the direction so as to be within the spiral cam of the roller 303c. The cassette holder 301 is down as shown in FIG. 22 to load the cassette.

The third preferred embodiment is characterized in that the rear side of the cam gear 310 is formed with spiral cam 310a and the the periphery of the front surface of the cam gear 310 is provided with an operation cam 310f. The spiral cam 310a is provided with an acute-angle portion 310e at the point between the outer groove and the spiral groove. A concave portion 310h is formed in the operation cam 310f. The cam gear 310 and the operation gear 310f are integrally combined. The front side of these elements are provided with a clutch disk 310c. In the clutch disk 310d, an arm 310b with a right-bending tip and being projected rearward, a stopper 310g, and a pin 310c engaged with a lever 317 are provided.

The lock lever 318 comprises a cam follwer 318a engaged with the operation cam 310f, and a lock member 318b, so that it is stressed toward resting with the operation can 310f by the spring. When the lock lever 318 is positioned at a possible rotation phase (the condition of FIG. 25) that the roller 303c becomes possibly in contact with the acute-angle portion 310e of the cam gear 310, it enables the stopper 310g provided on the clutch disk 310d to be locked. While it is the alternative rotation phase (the condition of FIG. 26), it releases the locking of the stopper 310g.

In operation, before the cassette is loaded and stored so that the cassette holder 301 becomes possibly down and, in addition, while the acute-angle portion 310e of the cam is not in a rotation phase of being in contact with the roller 303c the cam follwer 318a of the lock lever 318 is in contact with the outer surface of the operation cam 310f provided on the cam gear 310. The lock member 318b of the lock lever 318 is released from the stopper 310.

When the cassette is loaded so that cassette holder 301 will become down and the acute-angle portion 310e of the cam is in a rotation phase of possibly being contact with the roller 303c, the cam follwer 318 of the lock lever 318 is inserted into cocave portion 310h of the operation 310f provided in the cam gear 310, so that the lock member 318b of the lock lever 318 locks the stopper 310g of the clutch disk 310d. The rotation of the clutch disk 310d is stopped. The connection lever 317 cannot attract the stop disk 316, so that the roller 303c is not lowered. The acute-angle portion 310e of the cam is not in contact with roller 303c. When the cam gear 310 is started to be rotated, the cam follwer 318a of the lock lever 318 becomes in contact with the outer periphery of the operation cam 310f, so that the lock member 318b of the lock lever 318 is released from the stopper 310g. The clutch disk 310d is started to be rotated and the roller 303c can be engaged with the spiral cam 310a. At this condition, the lock lever 318 rests against the stopper 310g, so that the stopper 310g is prevented from being locked.

As stated above, the cassete loading system of the cassette recorder comprises the cassette holder 301 for sustaining the cassette, the traveling roller 314 for traveling the cassette substantially in horizontal, the cassette detection lever for detecting whether the cassette has been completely transferred horizontally, the holder arm 303 for vertically transferring the cassette, comprising the spiral cam 310a and the roller 303c engaged with this cam, the stop plate 316 for preventing the cassette holder from being transferred from the horizontal movement to the vertical downward movement, the connection lever responsive to the drive power of the clutch mechanism from the cam gear 310 for releasing the stop operation of the stop disk 316, and the cassette detection lever lock claw 304c for locking not to release the locking of the stop disk 316 until the connection lever has traveled the cassette horizontally. According to the gist of the third preferred embodiment of the present invention, the lock lever 318 and the operation cam 310f are provided in the cam gear 310. The lock lever 318 is provided for stopping the release by the connection lever 317 by locking the clutch disk 310d when the spiral cam 310a is rotated in a predetermined rotation phase. The operation cam 310f is provided to oeprate the lock lever 318. Even when the roller 303 is down slight, the roller 303c can be transferred smooth to the spiral portion of the cam.

A fourth preferred embodiment of the present invention is shown in FIGS. 27–34 where the load of a cassette guiding roller can be reduced to smoothly switch between the horizontal movement and the vertical movement of the cassette.

FIGS. 27 through 34 show the fourth preferred embodiment of the present invention. Those elements of FIGS. 27 through 34 are indicated by like numerals in FIGS. 3 through 7.

Figure 27:
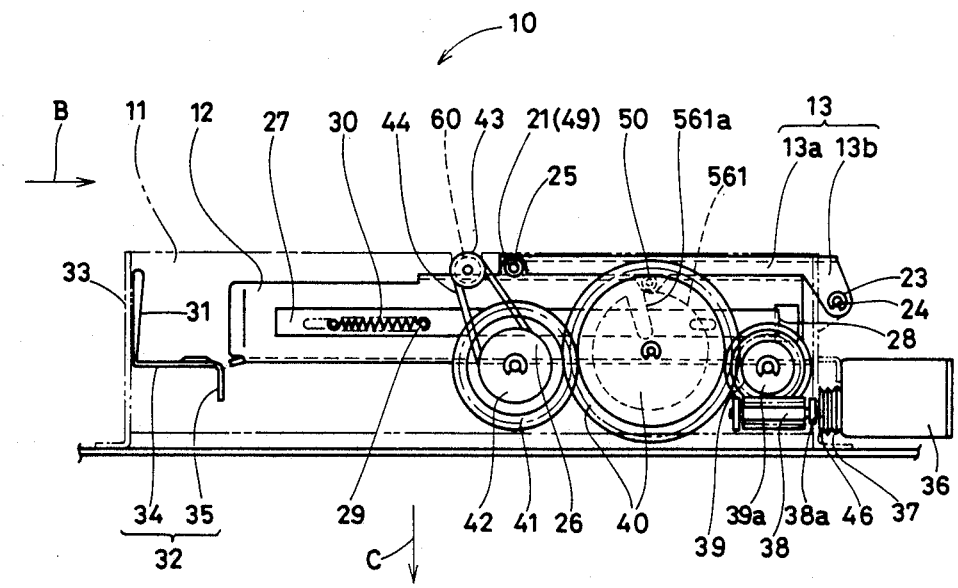
FIG. 27 is a side view of a cassette loading system according to a fourth preferred embodiment of the present invention.
Figure 28:
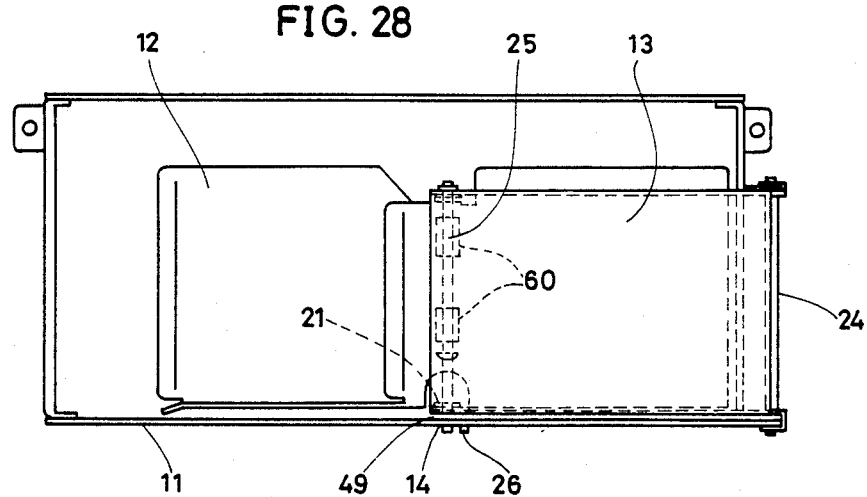
FIG. 28 is a plan view of FIG. 27.
Figure 29:
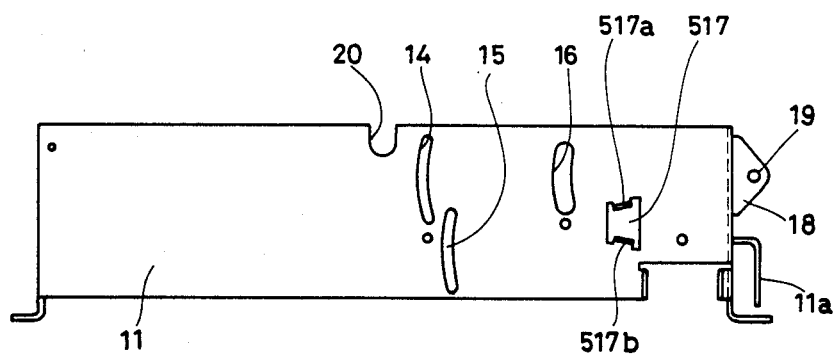
FIG. 29 is a side view of a frame in the cassette loading system for the fourth preferred embodiment of the present invention.
Figure 30:
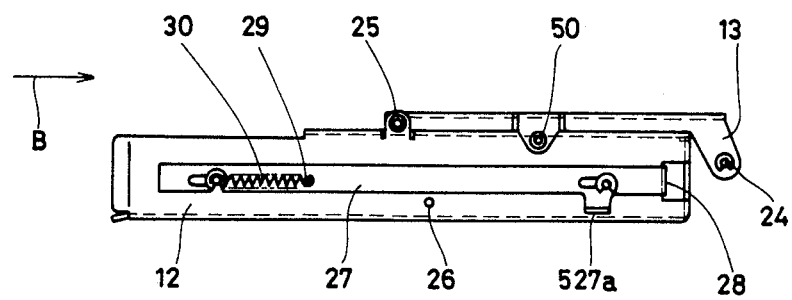
FIG. 30 is a side view of a cassette holder in the cassette loading system for the fourth preferred embodiment of the present invention.
Figure 31:
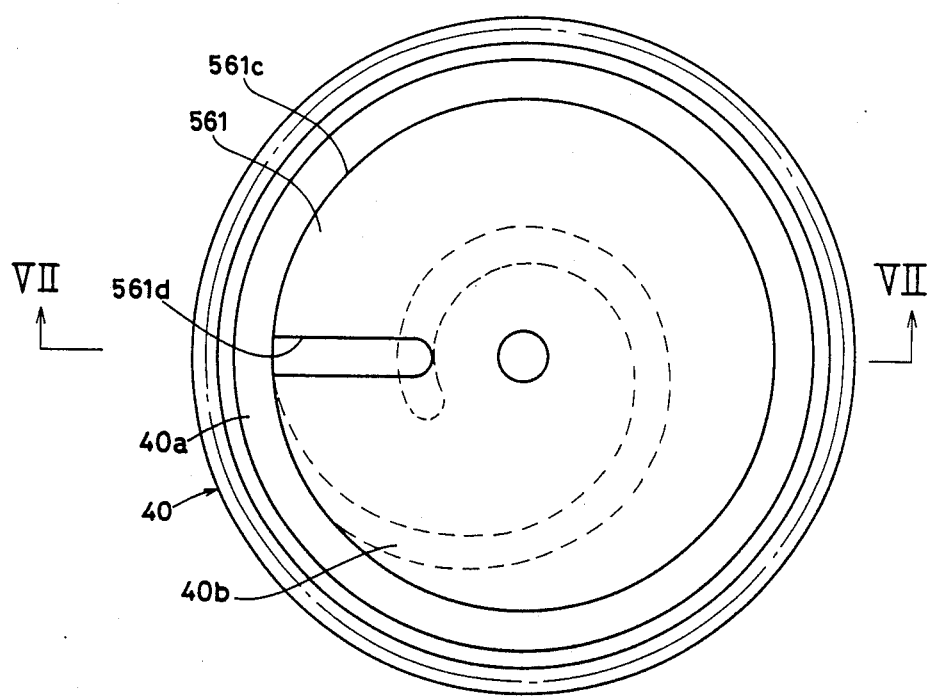
FIG. 31 is an enlarged view of a cam wheel in the cassette loading system for the fourth preferred embodiment of the present invention.
Figure 33:
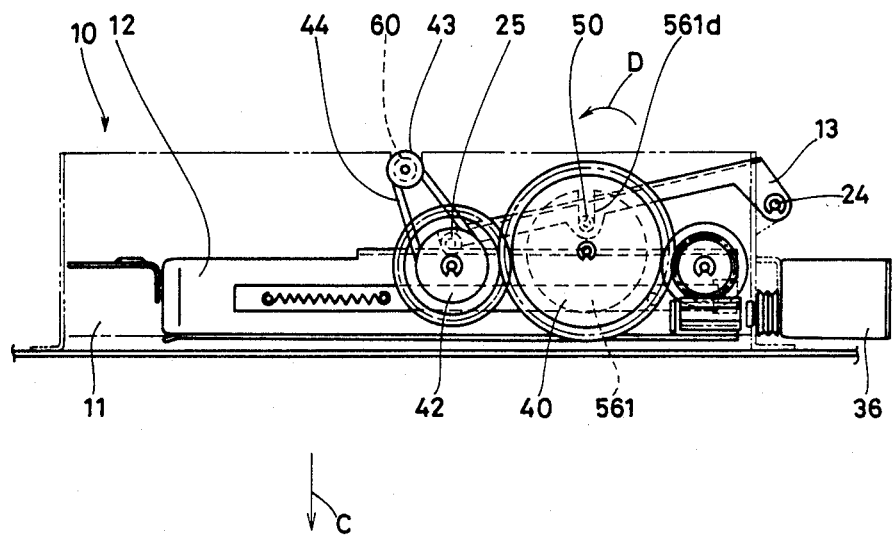
FIG. 33 is a side view of the cassette loading system of FIG. 27 to which a cassette is loaded.

FIG. 27 shows a side view of the cassette loading system of the fourth preferred embodiment of the present invention. FIG. 28 shows a plan view of the view of FIG. 27. As shown in FIG. 29, in the right side of the elongated aperture 16, a stop element 517 is provided. At the top side of the stop element 517, a stop portion 517a is provided with extended right to flame 11. At the other side of the stop element 517, a stop element 517b is provided in parallel with the stop element 517a. As shown in FIG. 30, at the right end of the cassette detection lever 27, a lock means 527a is provided for enabling a stop means not to release the locking till the cassette has been horizontally traveled, the stop means preventing the holder arm 13 from being down. A cam wheel 40 is provided with a circular cam surface 40a and the spiral cam surface 40b coupled (as shown in FIG. 31). In FIGS. 27 and 33, the cam surfaces 40a and 40b are omitted. The pin 50 of the holder arm 13 can be moved as the follower along the cam surface 40a and 40b. The cam wheel 40 is provided with a stop disk 561 to prevent the downward movement of the holder arm 13.

Figure 32:
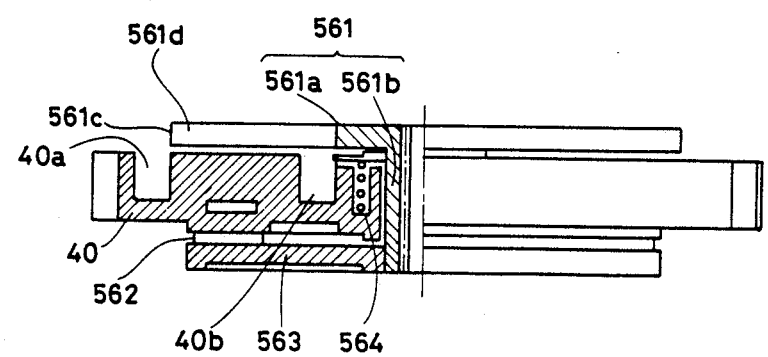
FIG. 32 is a sectional view taken along line VII—VII of FIG. 31.

FIG. 31 shows an enlarged view of the cam wheel 40. FIG. 32 is a sectional view of the cam wheel 40 taken along the line of VII—VII of FIG. 31. Under the cam wheel 40, a slip plate 563 is provided. Above the cam wheel 40, a stop plate 561 is provided. The stop plate 561, the cam wheel 40, and the slip plate 563 are coaxial. The stop plate 561 includes a circle portion 561a and a projection portion 561b projected right from the circle portion 561a. The cam wheel 40 and the slip plate 563 are loosely inserted into the projected portion 561b. A U-shaped groove 561d is formed in the stop 561 lineally from the outermost periphery portion 561c to the inside of it. A projection portion 562 projected to the cam wheel 40 is attached to the slip plate 563. The cam wheel 40 is made of a felt being a large friction material. The cam wheel 40 stresses toward the projected portion 562 with the spring 564. The cam wheel 40 is coupled with the projected portion 561b of the stop element 561. In this arrangement, when the cam wheel 40 is rotated, a friction force is generated in the projected portion 562 due to the press force of the spring 564, so that a predetermined rotation torque is transferred to the slip plate 563.

Figure 34:
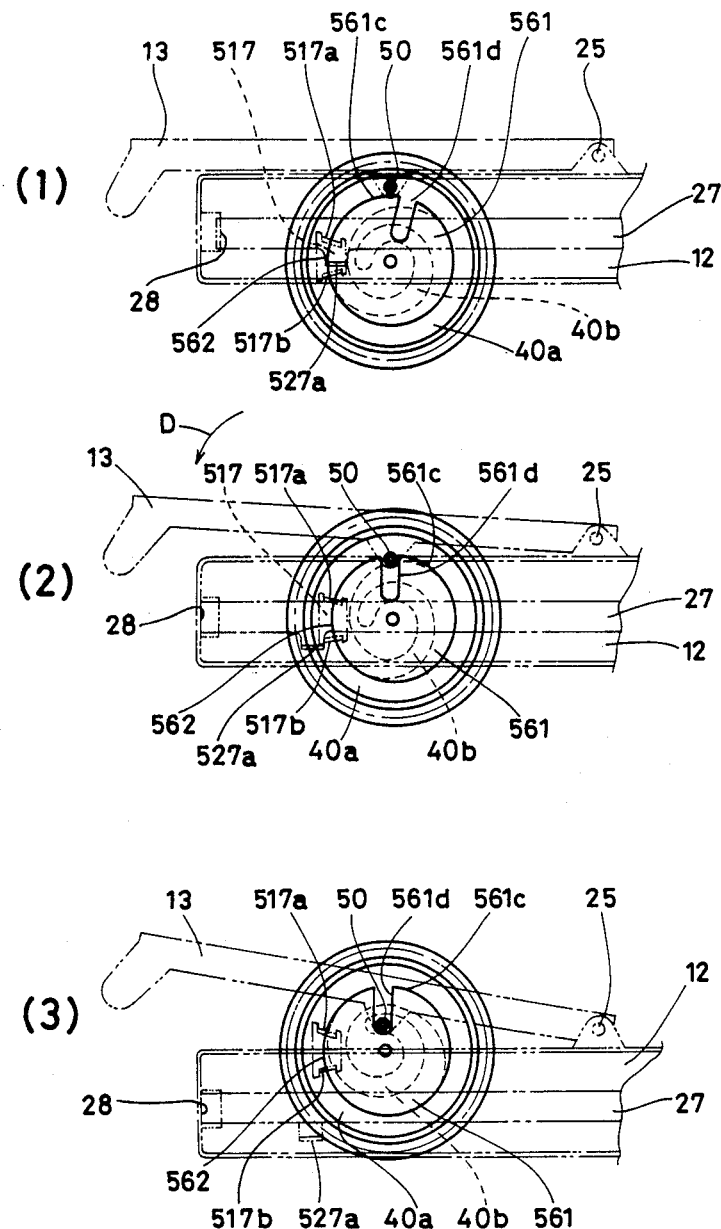
FIGS. 34(1), 34(2), and 34(3) are a side view of the primary elements of the cassette loading system, explaining the lowering movement of a holder arm 13.
Figure 35:
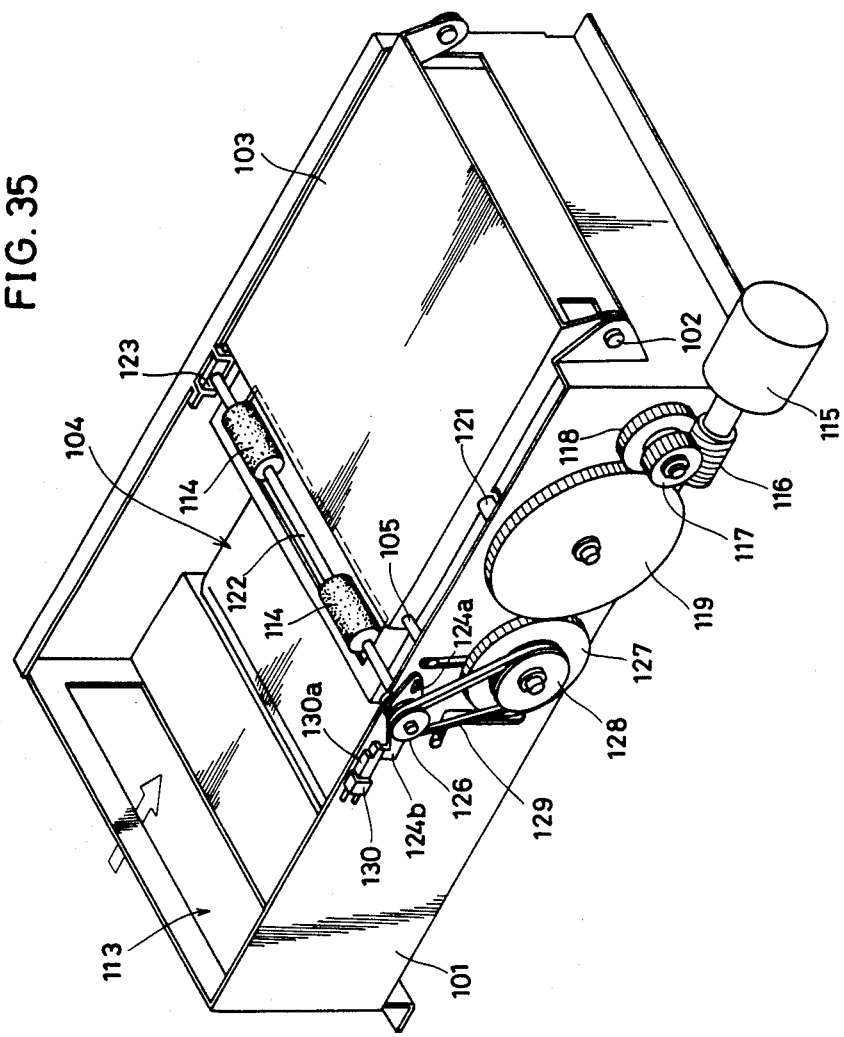
FIG. 35 is a perspective view of a cassette loading system according to a fifth preferred embodiment of the present invention.
Figure 36:
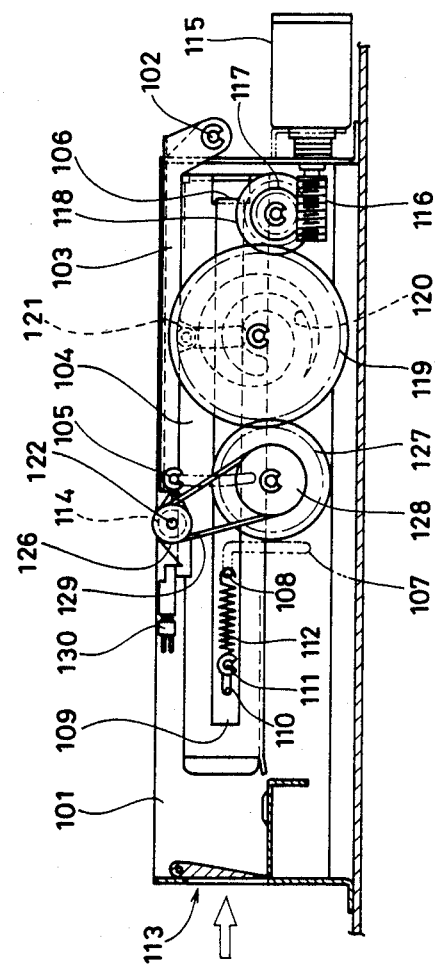
FIG. 36 is a side view of the cassette loading system of FIG. 35.
Figure 37:
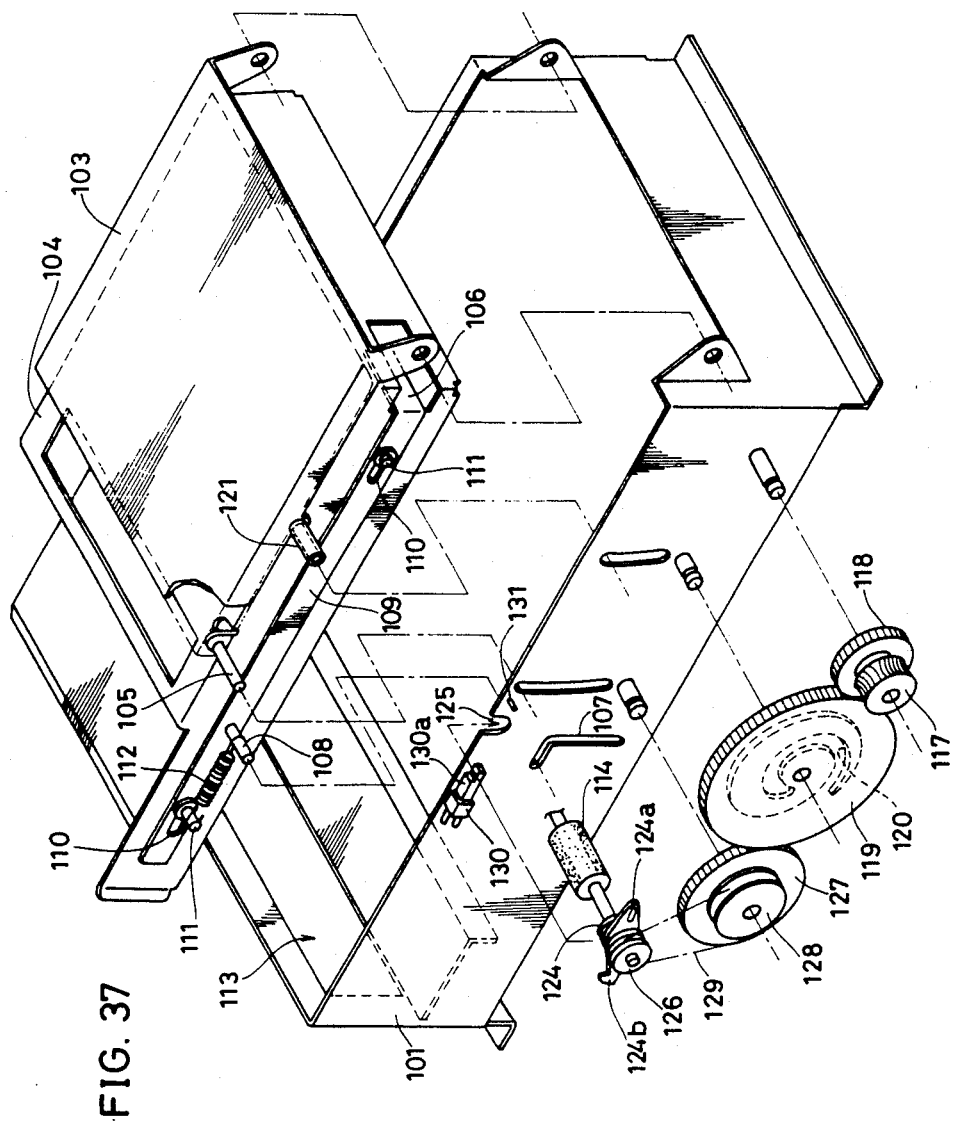
FIG. 37 is an exploded view of the cassette loading system of FIG. 35.
Figure 38:
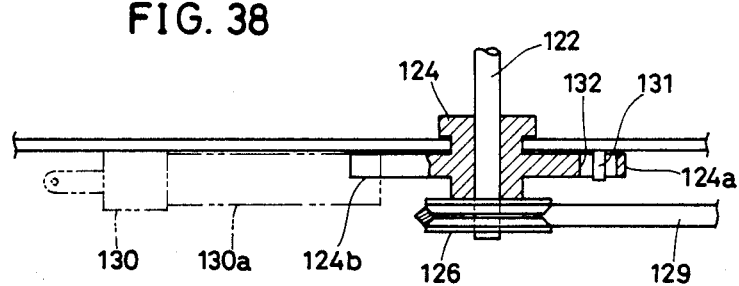
FIG. 38 is a plan view of a cassette detection means used for the cassette loading system.
Figure 39:
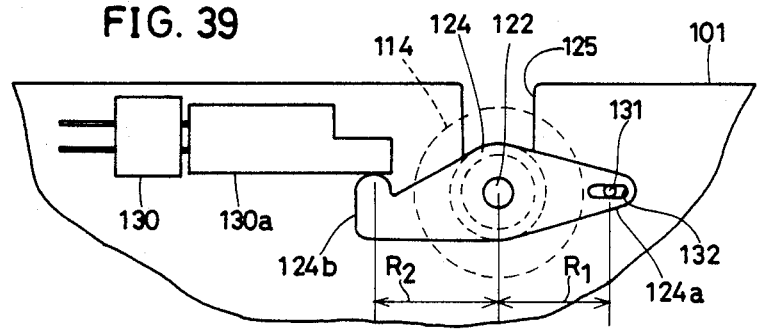
FIG. 39 is a side view of FIG. 38.

FIG. 33 shows a side view of the cassette loading system 10 when the cassette holder 12 is down in response to the loading the cassette in the cassette holder 12. When the cassette is inserted through the cassette inlet 33, the motor 36 is rotated, so that the guiding roller 60 is rotated in arrow dirction D. The cassette is horizontally traveled in the cassette holder 12. While the cassette detection lever 27 is positioned as shown in FIG. 27, the projected portion 50 of the holder arm 13 is in contact with the outer periphery of the portion 561c of the stop plate 561, so that it is prevented from invading into the spiral cam surface 40b. As the cassette is inserted into the cassette holder 12, the cassette detection lever 27 is moved. The locking of the stop plate 561 stopping the movement of the holder arm 13 as will be described below is released so that the stop plate 561 is rotated in the reverse to the direction D as shown in FIG. 33. The projection portion 50 of the holder arm 13 is started to be engaged with spiral cam surface 40b. Therefore, the holder arm 13 is lowered in the direction of arrow C by the guide member 32. Eventually, the loading of the cassette is completed as shown in FIG. 33. FIG. 34 shows a view for explaning the releasing condition of the stop means stopping the down movement of the holder arm 13. The projected portion 562 of the stop plate 561 is engaged with the stop portion 517 of the frame 11. The stop plate 561 can be rotated between the stop portions 517a and 517b. When the cassette is not loaded as shown in FIG. 34(1), the projected portion 562 is in contact with the lock member 27a of the cassette detection lever 27, so that the rotation of the stop plate 561 is prevented. In this case, as shown in FIG. 34(1), the stop plate 561 is such that the projected portion 50 fixed on the holder arm 13 is not inserted into the U-shaped groove 56d. When the cassette 1 is loaded so that the cassette detection lever 27 is moved, as shown in FIG. 34(2), the lock member 27a of the cassette detection lever 27 is shifted, so that it is far from the projected portion 563. The rotation of the stop plate 561 in the direction D is permitted. When it is rotated in the direction D, it comes into contact with the stop portion 517b of the frame 11 so that the rotation of the stop plate 561 is stopped. At the same time, the U-shaped groove 561d of the stop plate 561 is in such a position as to be able to receive the insertion of the projected portion 50 of the holder arm 13. For this while, the cam wheel 40 is continued to be rotated. Then, the spiral cam surface 40b continues to be rotated also so that the inner movement of the projected portion 50 along the spiral cam surface is permitted as shown in FIG. 34(2). Under the condition, when the cam wheel 40 is started to be rotated, the projected portion 50 of the holder arm 13 is advanced inner side along the U-shaped groove 561d. Therefore, the cassette holder 12 can be lowered as it remains horizontal. When the projected portion 50 reaches the bottom of the inner side of the U-shaped groove 561d, as shown in FIG. 34(3), the cassette loading operation is positioned as shown in FIG. 34(3).

The cassette can be taken out in the reverse manner as stated above. In such a case, even when the stop plate 561 is reversed to arrow direction D in FIG. 34(2), the rotation of the stop plate 561 is prevented by the projected portion 50 so long as the projected portion 50 of the holder arm 13 is within the U-shaped groove 560d. When the projected portion 50 is far from the U-shaped groove 561d, the stop plate 561 can be rotated so thatit is rotated in the reverse direction to arrow direction D. When the projected portion 50 comes into conact with the stop member 517a of the frame 11, it is stopped. The cassette is moved in the taken-out position by the guide roller 60, so that the cassette detection lever 27 is recovered by the force of the spring 30 to be a condition as shown in FIG. 34(1), again.

A yet further attention is now directed to a fifth preferred embodiment of the present invention where a slight movement of a roller in response to the cassette attachment can be magnified by a pair of operation members provided with a bearing collar and detected by a sensor. The roller can be rotated immediately in response to the contact of the cassette to the roller.

With reference to FIGS. 35 through 41, the cassette loading system of the fifth preferred embodiment is characterized in that at the end of a frame 101, a seesaw arm 103 is provided which is pivotally supported by a pivotal axis 102. At the tip of the arm 103, the upper front center of a cassette holder 104 is horizontally maintained by a pivotal axis 105. At the output side surface of the cassette holder 104, an operating member 106 and a slidable lever 109 are positioned as being movable in the front and the rear directions in a predetermined distance with two pairs of elongated holes 110 and a guide pin 111. The operating member 106 is faced to the innermost portion of the cassette holder 104. The slidable lever 109 is provided with a pin 8 inserted into an L-shaped hook 107. A spring 112 is provided between the pin 108 and a guide pin 111 projected on the side of the cassette holder 104. The slidable lever 109 is continuously stressed in the front direction of the system (the counterclockwise in the drawing). The cassette holder 104 is maintained at the same height as that of a cassette inlet 113 provided at the front side of the frame 101 by the elongated portion of the L-shaped hook 107 via the pin 108. When the cassette (not shown) is loaded into the system through the cassette inlet 103 in the direction of the arrow, it is moved at a predetermined position of the cassette holder 104, it is forcibly pressed in the arrow direction by a roller 114 driven at the frame 101. At the last condition of forcibly pressing the cassette, the cassette tip presses the operation member 106 against the spring 112 to move the slidable lever 109. The pin 108 on the slidable lever 109 is moved to the end portion of the elongated hole in the L-shaped hook 107 and, finally, to the starting point of the hole, so that the down movement of the cassette holder 104 is permitted. It starts slight to be down according to its weight, the weight of the seesaw arm 108 and the inserted cassette.

At this time, a starting point of a spiral cam groove 120 is engaged with a roller 121 rotatably provided on the side of the seesaw arm 103. The spiral cam groove 120 is provided on the side of a gear 119. The gear 119 is rotated clockwise by the movement of a motor 115, a worm 116, a worm wheel 117, and a gear 118. The engagement of the roller 121 to the cam groove 120 enables the seesaw arm 103 to be forcibly be pushed downwardly. Accordingly, the cassette holder 104 is moved vertically downwardly to a predetermined position.

As the axis support and driving mechanism of the cassette forward roller 114, an end of a rotation axis provided with the roller 114 is inserted into a bearing member 123 which is supported on the frame 101, is movable upward and downward, and is pressed downward. Adjacent the other end of the axis 122, a bearing collar 124 is provided with a circle at its peripheral. The collar 124 is coupled with a concave portion 125 formed on the upper brim of the frame 101 in such a manner that it is movable up and down. At the outer projection end of a collar 124 on an axis 122, a pulley 126 is fixed. At the side of an idle gear 127 coupled with the gear 119 with the spiral cam groove 120, a pulley 128 is provided. A rubber belt 129 is extended between the pulleys 126 and 128, so that the roller 114 is rotated counterclockwise with the belt. The tension of the belt 129 permits the roller 114 to be stressed toward the cassette holder 104.

On the condition that the bearing collar 124 is down to the bottom of the concave portion 125, the clearance between the bottom of the roller 114 and the cassette supporting surface of the cassette holder 104 is slight smaller than the thickness of the cassette. A pair of operation members 124a and 124b are provided which are projected to the front and the rear from the bearing collar 124. The tip of the operation member 124a is engaged with a fix pin 131 on the frame 101 with the elongated hole 132. The tip of the operation member 124b is in contact with the lower surface of a contact member 130a of a switch 130 provided on the outer side of the frame 101 to serve as a cassette loading detection sensor. After the stored cassette is in contact with the roller 114, the bearing collar 124 is slightly lifted when in response to the cassette insertion operation the roller 114 is lifted slight with extending the belt. The tip of the operation member 124b not engaged with the frame 101 is lifted to switch on the switch 130. The motor 115 is powered and driven. The driving of the roller 114 enables the cassette to promptly be catched by the roller 114 so that it is forcibly moved. When the effective radiuses of the operation member 124a and 124b are assumed to be R1 and R2, respectively, the point of application of the operation member 124b is shifted (R1+R2)/R1 times the upward shift distance of the bearing collar 124, so that according to the very slight movement of the roller enables the roller activation.

Figure 40:
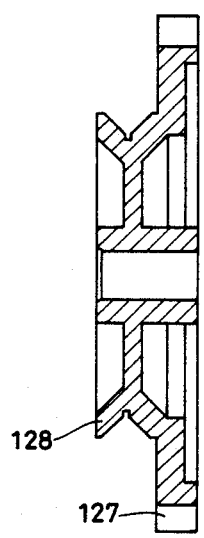
FIG. 40 is a sectional view of a driving pully 128 and a gear 127 in the embodiment of FIG. 35.
Figure 41:
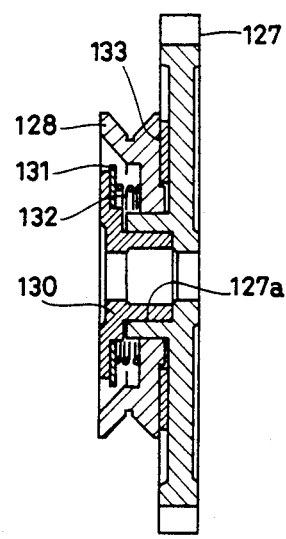
FIG. 41 is a sectional view of another form of the driving pulley 128 and the gear 127 in the embodiment of FIG. 40.

In the fifth preferred embodiment as stated above, the pulley 128 and the gear 127 are integrally combined as shown in FIG. 40. Alternatively, they can be formed as shown in FIG. 41. In the embodiment of FIG. 41, while the cassette movement is switched from the cassette horizontal-movement operation to the cassette vertical-movement operation, the still cassette cannot receive a horizontal-press force more than the force which is necessary to horizontally forward the cassette. The consumption of the components and abnormal power supply to the driving motor in forcibly forwarding the cassette can be prevented.

With reference to FIG. 41, the driving pulley 128 is independent on the gear 127, so that it is coupled with the boss 127a of the gear 127 as being rotatable and is coupled with a boss 130 with a frange installed on the boss 127a. Between a thrust collar 131 supported on the inner side of the boss 130 and the pulley 128, a spring 132 is provided so that the pulley 128 is stressed toward the gear 127. Between the pulley 128 and the gear 127, a friction plate 133 is interposed. When the pulley 128 is loaded by a load more than a predetermined load, the pulley 128 and the gear 127 are slipped. Thus, a torque limiter means is provided for preventing the application of a predetermined stress or more to the pulley 128. The torque limiter means can be interposed between the pulley 126 and the rotative axis 122. The rotative axis 122 can be driven with a gear means.

While only certain embodiments of the present invention have been described, it will be apparent to those skilled in the art that various changes and modifications may be made therein without departing from the spirit and scope of the present invention as claimed.

What is claimed is:

1. A cassette loading system comprising:
   holder means for storing said cassette, said holder means receiving said cassette as it is moved in a first direction;
   holder arm means for supporting said holder means, said holder arm means being coupled to said holder means and being pivotable about an axis perpendicular to the insertion direction;
   guide means for guiding the holder means in a second direction, said guide means including a projection which is responsive to insertion of said cassette into said system such that said projection moves in said insertion direction;
   drive means for moving said holder means in said second direction, said drive means including a wheel member capable of rotation about an axis which is parallel to the pivot axis of said holder arm means, said member having a first and second surface thereon; and
   connection means associated with said holder arm means, said connection means being engageable with said first surface of said wheel member before said cassette is loaded into said system, said connection means being engageable with said second surface of said wheel member in response to movement of said projection whereby when said connection means is engaged with said second surface, movement of said holder means in said second direction is permitted.

2. The cassette loading system of claim 1, wherein said first direction is a horizontal direction and said second direction is a vertical direction.

3. The cassette loading system of claim 1, further comprising:
   groove means for preventing incorrect insertion of said cassette; and
   projected means for engaging said groove means, said projected means being provided on a side of said holder means and said projected means binding said cassette.

4. The cassette loading system of claim 1, wherein said cassette is provided with a lockable front cover and with release projection means for locking said front cover, and said holder means is provided with second projection means for pushing the release projection means for unlocking said front cover when the cassette is inserted into the system.

5. The cassette loading system of claim 1, wherein said holder arm means simultaneously pivots about said pivot axis as said holder means moves in said second direction.

6. The cassette loading system of claim 1, wherein said cassette has a top, a bottom, two minor edges and two major edges and said holder means completely receives one of said minor edges of said cassette before the other of said minor edges is received.

7. The cassette loading system of claim 1, wherein said first surface of said wheel member comprises a circular cam surface and said second surface of said wheel member comprises a spiral cam surface.

8. A cassette loading system comprising:
first transport means for horizontally transporting the cassette;
cassette holder means for storing said cassette, said cassette holder means receives said cassette as the cassette is inserted in the horizontal direction, said cassette holder means being movable in a vertical direction;
detection means for detecting the completion of horizontal transport of said cassette, said detection means being provided on said cassette holder means and being movable in a horizontal direction and being movable in said vertical direction, said detection means moving with said cassette holder means in said vertical direction;
second transport means for vertically transporting the cassette; and
preventing means for preventing vertical transport of said cassette by said second transport means until said detection means detects completion of the horizontal transport.

9. The cassette loading system of claim 8, wherein said detection means move rectilinearly.

10. The cassette loading system of claim 8, wherein said cassette has a top, a bottom, two minor edges and two major edges and said holder means completely receives one of said minor edges of said cassette before the other of said minor edges is received.

11. A cassette loading system comprising:
first transport means for horizontally transporting the cassette;
cassette holder means for storing said cassette, said cassette holder means receives said cassette as the cassette is inserted in the horizontal direction;
detection means for detecting whether the horizontal transport of said cassette has been completed;
second transport means for vertically transporting said cassette, said second transport means including a wheel member capable of rotation, said wheel member being engageable with said cassette holder means in order to vertically move said cassette holder means;
prevent means for preventing vertical transport of said cassette by said second transport means until said detection means detects completion of the horizontal transport;
release means for permitting the prevent means to allow vertical transport of said cassette by said second transport means, said release means being driven through a clutch mechanism, said wheel member rotating only after said release means permits said prevent means to allow vertical transport; and
lock means for locking said release means and for ensuring said release means remain inoperative until said first transport means completes the horizontal transport of the cassette, said lock means being integrally combined with the clutch mechanism for driving the release means.

12. The cassette loading system of claim 11, wherein said cassette has a top, a bottom, two minor edges and two major edges of said holder means completely receives one of said minor edges of said cassette before the other of said minor edges is received.

13. A cassette loading system comprising:
first transport means for horizontally transporting the cassette;
cassette holder means for storing said cassette, said cassette holder means receives said cassette as the cassette is inserted in the horizontal direction;
detection means for detecting whether the substantially horizontal transport of said cassette has been completed;
second transport means for transporting said cassette in a substantially vertical direction, said second transport means comprising bar means for moving the cassette holder means in a vertical direction and spiral cam means for engaging a pin on said bar means, said spiral cam means being capable of rotating;
first prevent means for preventing the substantially vertical transport of said cassette until said detection means detects completion of the substantially horizontal transport;
release means for permitting the first prevent means to allow substantially vertical transport of said cassette by said second transport means, said release means being driven through a clutch mechanism;
lock means for locking said release means and for ensuring said release means remains inoperative until said first transport means completes the substantially horizontal transport of the cassette; and
second prevent means for preventing the release means from releasing the first prevent means while said spiral cam means of said second transport means is rotated at a predetermined phase.

14. The cassette loading system of claim 13, wherein said cassette has a top, a bottom, two minor edges and two major edges and said holder means completely receives one of said minor edges of said cassette before the other of said minor edges is received.

15. A cassette loading system for loading a cassette having a top, a bottom, two minor edges and two major edges, said cassette loading system comprising:
cassette holder means for storing said cassette, said cassette holder means completely receiving one of said minor edges before the other of said minor edges is received during a cassette insertion operation;
elevator means for lowering said cassette holder means;
stop means for stopping the lowering movement of said elevator means and for controlling the elevator means to stop movement of said cassette holder means;
release means for releasing the stop means in response to said cassette insertion operation and for permitting lowering of the cassette holder means by said elevator means;
coupling means interposed between said stop means and said release means for causing said release means to release a stop operation of said stop means; and
drive means for supplying a driving force for the loading and lowering operations, the stop means being responsive to the amount of force supplied by the drive means to said elevator means to control said elevator means.

16. A cassette loading system for loading a cassette having a top, a bottom, two minor edges and two major edges, said cassette loading system comprising:
cassette holder means for storing said cassette, said cassette holder means completely receiving one of said minor edges before the other of said minor edges is received during a cassette insertion operation;

elevator means for lowering said cassette holder means;

stop means for stopping the lowering movement of said elevator means, said stop means being in contact with a portion of said elevator means during stopping;

release means for releasing the stop means in response to the cassette insertion operation and for permitting lowering of the cassette holder means by said elevtor means, said release means causing said stopping means to move out of contact with said portion of said elevator in order to permit lowering;

driving means for driving the lowering of said elevator means; and coupling means interposed between said stop means and said release means for permitting the driving means to lower the elevator when said release means releases said stop means.

17. A cassette loading system comprising:

cassette holder means for storing said cassette;

horizontal transport means for horizontally transporting said cassette into said cassette holder means, said horizontal transport means comprises roller means for firmly pressing the cassette and drive means for rotating the roller means in order to move the cassette, said transport means being provided with limit means for limiting the horizontal transport of said cassette, said limit means including a pair of rotatable wheel members adjacent one another and a spring which urges one of the wheel members toward the other wheel member, said wheel members being frictionally engaged by the urging of said spring such that simultaneous rotation will occur between these two members unless a force is applied to one of the wheel members whereby slipping between the one rotating member and the one nonrotating member occurs, said limit means thereby permitting rotation of both said wheel members to permit horizontal transport of the cassette and after horizontal transport of the cassette is complete to permit one wheel member to continue rotating and the other wheel member to remain stationary; and vertical transport means for vertically transporting said cassette holder means upon completion of the horizontal transport of said cassette, said vertical transport means positioning said cassette held by said cassette holder means into a cassette recorder.

18. The cassette loading system of claim 17, wherein:

said cassette has a top, a bottom, two minor edges and two major edges and said holder means completely receives one of said minor edges of said cassette before the other of said minor edges is received.

* * * * *